United States Patent [19]
Shute

[11] 3,805,626
[45] Apr. 23, 1974

[54] FREQUENCY RESPONSIVE AMPLITUDE CONTROL

[75] Inventor: Donald William Shute, Burlington, Mass.

[73] Assignee: Space and Tactical Systems Corporation, Burlington, Mass.

[22] Filed: Jan. 28, 1971

[21] Appl. No.: 110,749

Related U.S. Application Data

[62] Division of Ser. No. 843,422, July 22, 1969, Pat. No. 3,593,202.

[52] U.S. Cl. .................................................. 74/43
[51] Int. Cl. ............................................. F16h 21/18
[58] Field of Search ................................. 74/43, 41

[56] References Cited
UNITED STATES PATENTS
R20,287   3/1937   Patterson ........................ 74/41 X
2,548,807   4/1951   Morgan et al. ........................ 74/41

Primary Examiner—Leonard H. Gerin
Assistant Examiner—Wesley S. Ratliff, Jr.
Attorney, Agent, or Firm—Joseph S. Iandiorio

[57]  ABSTRACT

Frequency responsive amplitude control apparatus is disclosed including means for combining a first parameter with a second parameter to produce a third parameter, and means for varying impedance to the third parameter in response to the frequency of the third parameter introduced by the second parameter to produce a fourth parameter whose amplitude is a function of the frequency of the second parameter.

2 Claims, 4 Drawing Figures

PATENTED APR 23 1974 3,805,626
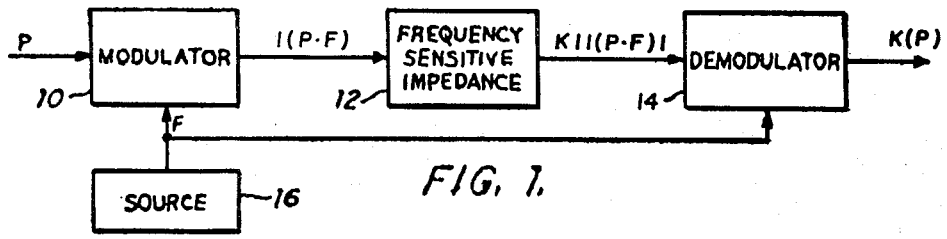
FIG. 1.
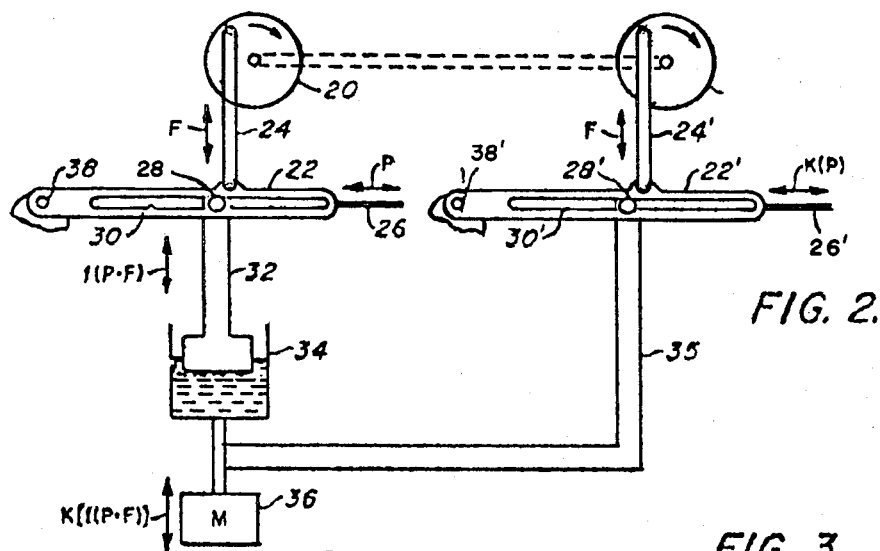
FIG. 2.
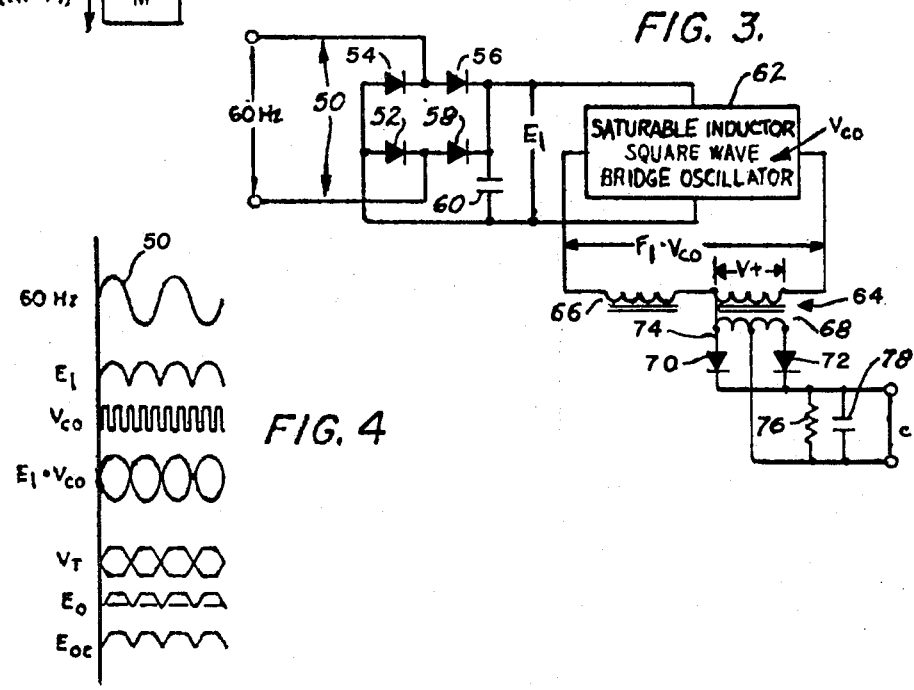
FIG. 3.
FIG. 4

FREQUENCY RESPONSIVE AMPLITUDE CONTROL

This application is a division of application Serial No. 843,422, filed July 22, 1969, now U.S. Pat. No. 3,593,202.

BACKGROUND OF INVENTION

This invention relates to a frequency responsive amplitude control, and more particularly to circuits and mechanisms whereby the amplitude of a chosen parameter may be controlled in accordance with the frequency of another parameter.

SUMMARY OF INVENTION

It is an object of this invention to provide a frequency responsive amplitude control which may be embodied in an electrical system, a mechanical, hydraulic or other system whereby the amplitude of a first parameter may be controlled by the frequency of a second.

It is a further object of this invention to provide a frequency responsive amplitude control voltage regulator whereby the frequency varies proportionally with the input voltage and inversely with the regulated output voltage.

It is a further object of this invention to provide a non-dissipative voltage regulator which produces a regulated voltage whose amplitude and frequency vary proportionally so that their ratio is approximately constant.

It is a further object of this invention to provide a small, light weight, compact and reliable voltage regulator.

It is a further object of this invention to provide a frequency responsive amplitude control which in its electrical form may be utilized in various ways such as a frequency controlled regulator, a signal modulator or multiplier, a frequency controlled potentiometer or impedance.

It is a further object of this invention to provide a frequency responsive amplitude control which in its mechanical form may be utilized in various ways such as a governor or regulator of motion or speed.

The invention may be accomplished by a frequency responsive amplitude control apparatus including means for combining a first parameter with a second parameter to produce a third parameter. There are means for varying impedance to the third parameter in response to the frequency of the third parameter introduced by the second parameter to produce a fourth parameter whose amplitude is a function of the frequency of the second parameter.

DISCLOSURE OF PREFERRED EMBODIMENT

Other objects, features and advantages will occur from the following description of a preferred embodiment and the accompanying drawings, in which:

FIG. 1 is a block diagram of a system according to this invention.

FIG. 2 is a mechanical system according to this invention.

FIG. 3 is a schematic diagram of a voltage regulator circuit using a saturable inductor square wave bridge oscillator as both the source of the modulating signal and the modulator according to this invention.

FIG. 4 is a chart of the waveshapes appearing in the circuit of FIG. 3.

There is shown in FIG. 1 a frequency responsive amplitude control system including a modulator 10 which combines a first input P with a second input F from source 16. The output $f(P \cdot F)$ of modulator 10 is delivered to a frequency sensitive impedance 12 which may be an electrical, mechanical or other type of device whose impedance to the input $f(P \cdot F)$ is a function of the frequency of that input. The output $K[f(P \cdot F)]$ of impedance 12 has an amplitude which is a function of the frequency of input F. The output $K[f(P \cdot F)]$ may be submitted to a demodulator 14 along with input F to produce output $K(P)$ which is the input P having had its amplitude varied as a function of the frequency of input F with the input F now removed. The system of FIG. 1 may include electrical circuits whereby the inputs and outputs of FIG. 1 are electrical signals and impedance 12 is a capacitor or inductor or any other device whose impedance is a function of frequency.

The system of FIG. 1 may also be a mechanical system such as shown in FIG. 2. Rotating wheel 20 through rod 24 imparts an oscillating motion F to lever 22 pivoted at pivot 38. Motion P provided through rod 26 to pin 28 slidable in slot 30 combines with motion F to cause piston 32 to move with motion $f(P \cdot F)$. Mass 36 attached to dash pot 34 therefore moves with a motion $K[f(P \cdot F)]$ because of the damping action of the piston 32 and dash pot 34 assembly. The stroke of mass 36 may be shortened by moving pin 28 toward pivot 38 and lengthened by moving pin 28 away from pivot 38. As the frequency of oscillation of F increases, the impedance of dash pot 34 to motion $f(P \cdot F)$ of piston 32 increases, and thus mass 36 tends to follow piston 32 more closely as the speed of rotation of wheel 20 increases. The motion $K[f(P \cdot F)]$ may be demodulated to regain motion P as modified by motion F by means of a connector rod 35 having a pin 28' slidable in slot 30' of lever 22' movable about pivot 38'. Motion F is imparted to lever 22' through rod 24' by wheel 20' so that motion $K(P)$ is established in rod 26'.

A regulated d.c. power supply may be constructed according to this invention, FIG. 3, whereby a 60 hz or any other power line frequency input voltage, FIG. 4, may be converted to a regulated d.c. output voltage $E_o$. The 60 hz input signal 50, FIG. 4, is submitted to a suitable bridge rectifier consisting of diodes 52, 54, 56, 58, where the input voltage is rectified to provide a 120 hz voltage $E_i$, FIG. 4, between the cathodes of diodes 56, 58, and the anodes of diodes 52, 54, and across a small, 0.1 uf, high frequency capacitor 60. The voltage $E_i$ is submitted to a saturable inductor square wave oscillator 62, such as described in U.S. Pat. No. 3,030,590, G.L. Fougere, et al., Apr. 17, 1962, or any other suitable type. Oscillator 62 is one whose frequency of oscillation is proportional to the voltage input: as the input voltage increases the frequency of the output voltage $V_{co}$ increases. The output voltage $V_{co}$ of oscillator 62 is a square wave, FIG. 4. The output voltage of oscillator 62 is $E_i$ and $V_{co}$ mixed together or modulated by each other, i.e., $E_i \cdot V_{co}$, FIG. 4. Thus, oscillator 62 functions as both the source 16 and modulator 10 of FIG. 1. The output of oscillator 62 is connected to linear transformer 64 in series with linear inductor 66. Since the impedance of a reactive element is dependent upon the frequency of applied voltage:

$$z_c = 1/2\pi fc$$
$$z_L = 2\pi fL$$

where $z_c$ is the impedance of a capacitor of capacitance C to a voltage of frequency $f$ and $Z_L$ is the impedance of an inductor of inductance L to a voltage of frequency $f$, the impedance of inductor 66 increases as the frequency of $V_{co}$ increases. And since an increase in $E_i$ causes an increase in the frequency of $V_{co}$, the circuit inherently performs a voltage regulation operation. When $E_i$ increases, the impedance of inductor 66 increases and decreases the voltage $V_T$, FIG. 4, across transformer 64. The secondary 68 of transformer 64 is provided with two rectifiers 70, 72 that produce the voltage $E_o$, FIG. 4, between them and center tap 74 across load resistor 76. The $V_{co}$ component may be removed from $E_o$ by connecting capacitor 78 in parallel with resistor 76 to produce voltage $E_{oc}$, FIG. 4.

With this arrangement it is possible to convert a low frequency a.c. voltage to a regulated d.c. voltage in a non-dissipative manner. Also, if the frequency of $V_{co}$ is high, the inductor and transformer may be reduced in size. Further, the frequency responsive nature of the conductor in combination with the voltage amplitude responsive nature of the oscillator 62 makes it unnecessary to filter the 120 hz $E_i$ voltage prior to delivery to oscillator 62 and requires smaller filter capacitance than conventional systems at the output, $E_o$, to filter out the 120 hz ripple. If it is desirable to pass the modulated $V_T$ voltage through the transformer 74 before limiting, the inductor 66 may be placed in the secondary circuit of transformer 74.

The circuit of FIG. 3 and similar circuits according to this invention may be used to regulate d.c. voltages as well as a.c., for example, using a "chopper circuit" to produce an alternating current for submission to the reactance circuit. The circuit of FIG. 3 may be made a closed loop circuit by feeding back the $E_o$ voltage to drive the oscillator or other source of $V_{co}$.

Other embodiments will occur to those skilled in the art and are within the following claims:

What is claimed is:

1. A frequency controlled amplitude system comprising:
   a lever arm pivoted at a first point and having guide means extending along said lever arm;
   a drive wheel and a connecting rod interconnecting said drive wheel and said lever arm;
   a slide member movable along said guide means;
   damping means and a connecting member interconnecting said damping means and said slide member; and
   a load member interconnected with said damping means.

2. A frequency controlled amplitude system comprising:
   a lever arm pivoted at a first point and having guide means extending along said lever arm;
   a drive wheel and a connecting rod interconnecting said drive wheel and said lever arm;
   a slide member movable along said guide means;
   damping means and a connecting member interconnecting said damping means and said slide member;
   a load member interconnected with said damping means;
   a second lever arm pivoted at a second point and having second guide means extending along said second lever arm;
   a second drive wheel and a second connecting rod interconnecting said second drive wheel and said second lever arm;
   a second slide member movable along said second guide means; and
   means for interconnecting said second slide member and said load member.

* * * * *